US008888178B2

(12) United States Patent
Tanabe et al.

(10) Patent No.: US 8,888,178 B2
(45) Date of Patent: Nov. 18, 2014

(54) VEHICLE SEAT

(75) Inventors: Tomoaki Tanabe, Toyota (JP); Atsushi Suzuki, Toyota (JP); Yuuya Suzuki, Toyota (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 282 days.

(21) Appl. No.: 13/420,984

(22) Filed: Mar. 15, 2012

(65) Prior Publication Data

US 2012/0242124 A1 Sep. 27, 2012

(30) Foreign Application Priority Data

Mar. 24, 2011 (JP) .................................. 2011-065432

(51) Int. Cl.
  *B60N 2/42* (2006.01)
  *B60N 2/433* (2006.01)
  *B60N 2/36* (2006.01)
  *B60N 2/427* (2006.01)

(52) U.S. Cl.
  CPC *B60N 2/433* (2013.01); *B60N 2/36* (2013.01); *B60N 2/4221* (2013.01); *B60N 2/42709* (2013.01)
  USPC .................................. 297/216.14; 297/216.13

(58) Field of Classification Search
  CPC ........... B60N 2/42709; B60N 2/42745; B60N 2/4221
  USPC .............. 297/216.13, 216.14, 216.15, 216.16
  See application file for complete search history.

(56) References Cited

U.S. PATENT DOCUMENTS

| 5,749,624 | A | * | 5/1998 | Yoshida | 297/367 R |
| 7,527,334 | B2 | * | 5/2009 | Kiehler et al. | 297/216.13 |
| 8,480,174 | B2 | * | 7/2013 | Konagai et al. | 297/354.1 |
| 2006/0145522 | A1 | * | 7/2006 | Yamada | 297/367 |
| 2009/0134682 | A1 | | 5/2009 | Andou et al. | |
| 2013/0009432 | A1 | * | 1/2013 | Inoue | 297/216.13 |
| 2013/0169012 | A1 | * | 7/2013 | Evans | 297/216.13 |

FOREIGN PATENT DOCUMENTS

| JP | 2000-201767 | 7/2000 |
| JP | 2007-131044 | 5/2007 |
| WO | 2007/026571 | 3/2007 |

OTHER PUBLICATIONS

Japanese Office action dated Aug. 26, 2014, along with an English-language translation thereof.

* cited by examiner

*Primary Examiner* — Peter Brown
*Assistant Examiner* — Alexander Harrison
(74) *Attorney, Agent, or Firm* — Greenblum & Bernstein, P.L.C.

(57) ABSTRACT

There is provided a vehicle seat including reclining devices which are provided at both left and right side portions of a seat back, respectively, and having operation shafts connected to each other by a rod such that the operations shafts of the respective reclining devices rotate in synchronization with each other to release a locking state thereof, and a deformation member which is supported by a framework of the seat back and is configured to be deformed to move forward by collision of an object from a rear side due to a vehicle collision. The deformation member is engaged to the rod by the deformation movement to restrain a rotational movement of the rod in an unlocking direction of the reclining devices with a support of a framework strength of the seat back.

4 Claims, 6 Drawing Sheets

VEHICLE SEAT

BACKGROUND OF THE INVENTION

1. Field of the Invention

The present invention relates to a vehicle seat. More specifically, the present invention relates to a vehicle seat including reclining device placed at both left and right side portions of a seat back and having operation shafts connected to each other by a rod such that the reclining devices rotate in synchronization with each other to release a locking state.

2. Description of the Related Art

There has been known a vehicle seat employing an unlock preventing mechanism for preventing a reclining device from being unlocked due to an impact generated when a heavy load caused by vehicle collision is applied to a seat back (see WO2007/026571). Specifically, according to the vehicle seat disclosed in WO2007/026571, the reclining devices are placed at both left and right side portions of the seat back and have operation shafts integrally connected to each other by a rod to carry out the unlocking operation of the respective reclining devices. Accordingly, the unlocking operation of the respective reclining devices is performed in synchronization with each other through the rod. Since the rod is configured to be vulnerable to bending at some portions, the rod is applied with a bending force at the time of vehicle collision, and thus is deformed to release a rotational operation force for the unlock so as not to transmit the rotational operation force from one operation shaft to the other operation shaft.

SUMMARY OF THE INVENTION

However, it is not preferable to employ the configuration providing such vulnerable portions to the rod since reliability as a transmission member is lowered. Therefore, an aspect of the present invention is to provide a vehicle seat which can prevent a reclining device from being unlocked due to transmission of an unexpected rotating force at application of a heavy load, without deteriorating strength of a rod.

According to an illustrative embodiment of the present invention, there is provided a vehicle seat comprising: reclining devices which are provided at both left and right side portions of a seat back, respectively, and having operation shafts connected to each other by a rod such that the operations shafts of the respective reclining devices rotate in synchronization with each other to release a locking state thereof; and a deformation member which is supported by a framework of the seat back and is configured to be deformed to move forward by collision of an object from a rear side due to a vehicle collision. The deformation member is engaged to the rod by the deformation movement to restrain a rotational movement of the rod in an unlocking direction of the reclining devices with a support of a framework strength of the seat back.

According to this configuration, since there is provided the deformation member deformed to move by the collision of an in-vehicle installed object from the rear side in accordance with the collision of the vehicle, it is possible to prevent the reclining device from being unlocked due to transmission of an unexpected rotating force at application of a heavy load, without deteriorating strength of the rod.

In the above vehicle seat, the deformation member may be supported by a reinforcing member in a cantilever manner, the reinforcing member extending between frameworks of both side portions of the seat back at a rear side of the rod.

According to this configuration, since the deformation member is provided in the above-described state, the deformation member is likely to be formed forward by receiving the collision of the in-vehicle installed object from the rear side at the time of the vehicle collision. Accordingly, it is possible to more suitably achieve the function of preventing the reclining device from being unlocked by the deformation member.

The above vehicle seat may further include a handle lever which is configured to rotate the operation shafts of the respective reclining devices in the unlocking direction, and the handling lever may be configured to be rotated by a forward down operation at a shoulder portion of the seat back.

According to this configuration, even though the handle lever is operated in the forward down direction by an inertial force at the time of vehicle collision, the rotational movement of the rod is restrained by the deformation member such that the handle lever is not operated.

DETAILED DESCRIPTION

Hereinafter, illustrative embodiments of the present invention will be described with reference to the accompanying drawings.

First Illustrative Embodiment

Figure 1:
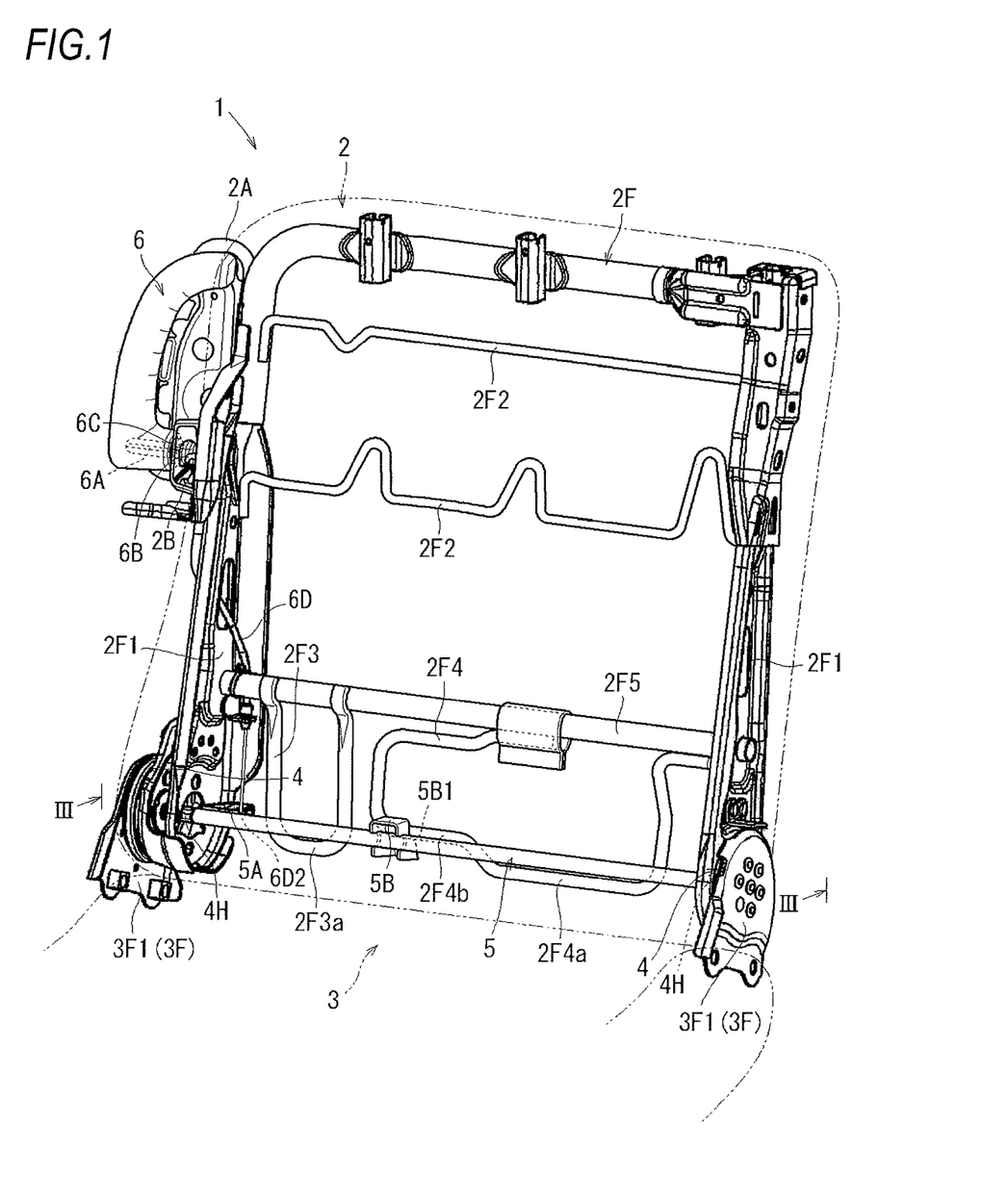
FIG. 1 is a perspective view illustrating a framework structure of a vehicle seat according to a first illustrative embodiment.

First, the configuration of a vehicle seat 1 according to the first illustrative embodiment will be described with reference to FIGS. 1 to 5. The vehicle seat 1 according to this illustrative embodiment is configured to serve as a seat for a second-row seat of the vehicle having three-row seats, as illustrated in FIG. 1. The vehicle seat 1 includes a seat back 2 serving as a backrest for a seated passenger, and a seat cushion 3 serving as a seating portion. A third-row seat is placed at a rear portion of the vehicle seat 1, but a seat back (not illustrated in the drawings) of the third-row seat is largely rotated in a storage state to form a luggage space which extends to the rear portion of the vehicle. The seat back 2 includes a seat back frame 2F forming a framework thereof, and a pair of side frames 2F1 and 2F1 are provided at both left and right sides of the seat back frame 2F. The seat cushion 3 includes a seat cushion frame 3F forming a framework of the seat cushion, and a pair of side frames 3F1 and 3F1 are provided at both left and right sides of the seat cushion frame 3F. The lower end portions of the side frames 2F1 and 2F1 are respectively connected to the rear end portions of the side frames 3F1 and 3F1, with reclining devices 4 and 4, which function as a rotational shaft device which can regulate rotation, being respectively interposed between the lower end portions and the rear end portions. In this way, when each of the reclining devices 4 and 4 is normally in a rotation regulated state (lock state), the seat back 2 is maintained in a state where an angle of the backrest is fixed. If the lock of the respective reclining devices 4 and 4 is released, the seat back is switched such that the angle of the backrest is adjustable.

The operation of unlocking the respective reclining devices 4 and 4 is performed by reclining a handle lever 6 in a forward direction. The handle lever is provided to a shoulder portion of the seat back 2 at a vehicle boarding door side (outside). Operation shafts 4H and 4H are respectively penetrated into a center portion of the respective reclining devices 4 and 4 for unlocking the respective reclining devices 4 and 4 by rotation of the operation shaft. The operation shafts 4H and 4H are integrally connected to each other such that the operation shafts are rotated in synchronization with each other by a rod 5 to unlock the reclining devices. The above-described handle lever 6 is extended to transmit an operation force to the rod 5 by a cable 6D. The handle lever 6 is shaft-connected to an upper portion of the outer side frame 2F1 of the seat back frame 2F in a rotatable manner. The handle lever 6 is usually held in an upwardly standing posture by a biasing force of a spring 6C hooked between the seat back frame 2F and the handle lever 6.

Figure 5:
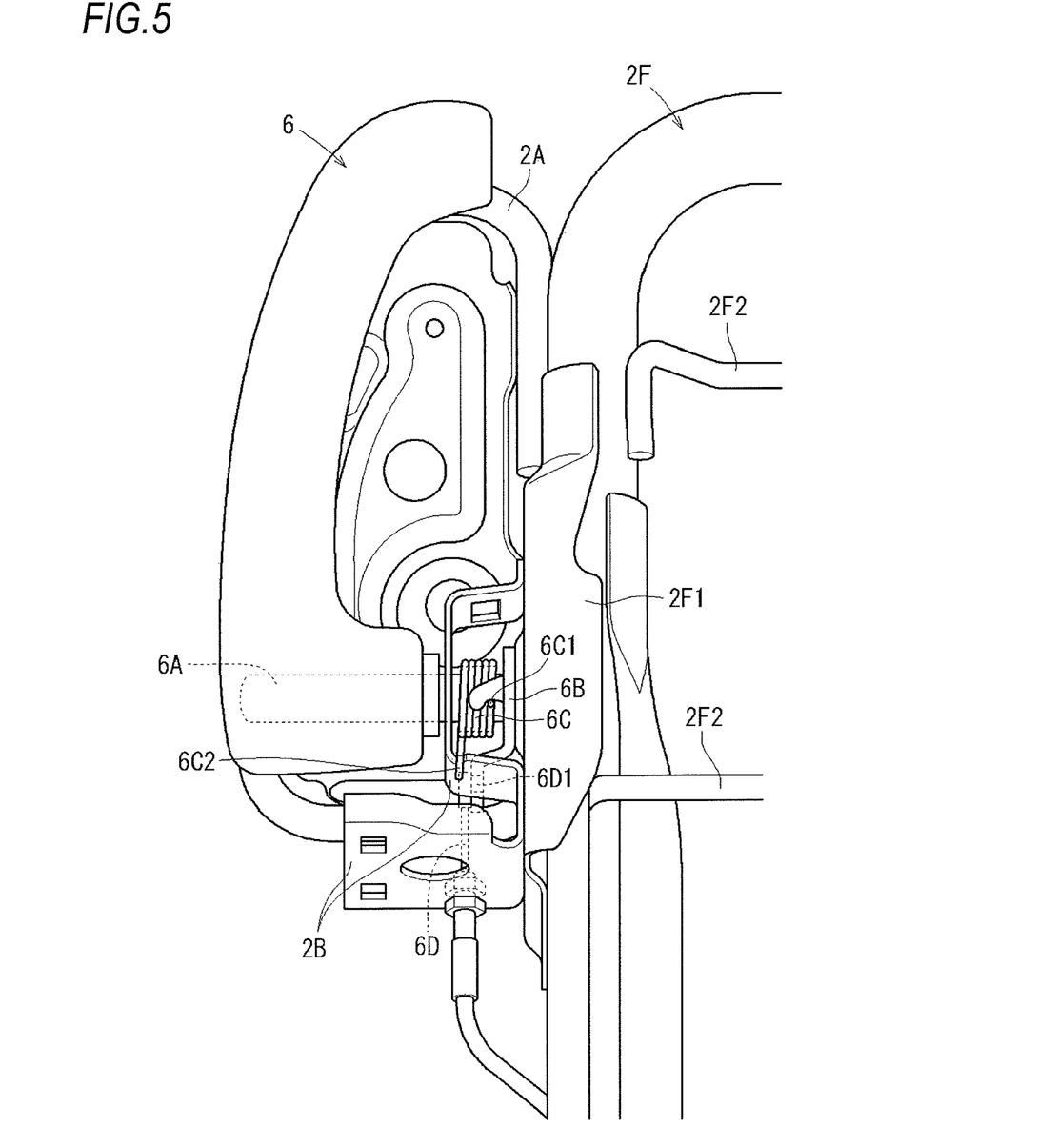
FIG. 5 is an enlarged view illustrating a configuration of a release lever.

Specifically, the handle lever 6 is integrally connected to a rotation shaft 6A, and the rotation shaft 6A is shaft-supported by the outer side frame 2F1 of the seat back frame 2F in a rotatable manner. As illustrated in FIG. 5, the rotation shaft 6A is integrally connected to an attachment bracket 6B for hooking one end portion 6C1 of the above-described spring 6C or an upper end portion 6D1 of the cable 6D. The spring 6C has one end portion 6C1 hooked to the attachment bracket 6B, and the other end portion 6C2 hooked to a locking bracket 2B which is integrally connected to the side frame 2F1. In addition, the upper end portion 6D1 of the cable 6D is hooked to the attachment bracket 6B, and a lower end portion 6D2 is hooked to an operation arm 5A which is integrally joined to the rod 5, as illustrated in FIG. 1. The operation arm 5A is configured to extend rearward from a portion near the outer end portion of the rod 5. With the hooking, the handle lever 6 is urged to be raised rearward by the urging force of the spring 6C at all times. As illustrated in FIG. 5, the attachment bracket 6B abuts against the locking bracket 2B from the rear side by its rotation, and thus is maintained in a locking state. As illustrated in FIG. 1, a protective bracket 2A protrudes toward the rear portion of the handle lever 6 and is integrally connected to the outer side frame 2F1 of the seat back frame 2F to protect the handle lever 6 against the load applied from the rear side.

From the normal state, if a user rotates the handle lever 6 in the forward direction against the urging force of the spring 6C, the cable 6D is pulled, and then the operation arm 5A connected to the lower end portion 6D2 of the cable 6D is pulled upward to rotate the rod 5. This causes the respective operation shafts 4H and 4H connected to both end portions of the rod 5 to rotate integrally, so that the locked state of the respective reclining devices 4 and 4 is released. In this way, the fixed state of the backrest angle of the seat back 2 is released to adjust the backrest angle of the seat back 2 back and forth.

Figure 3:
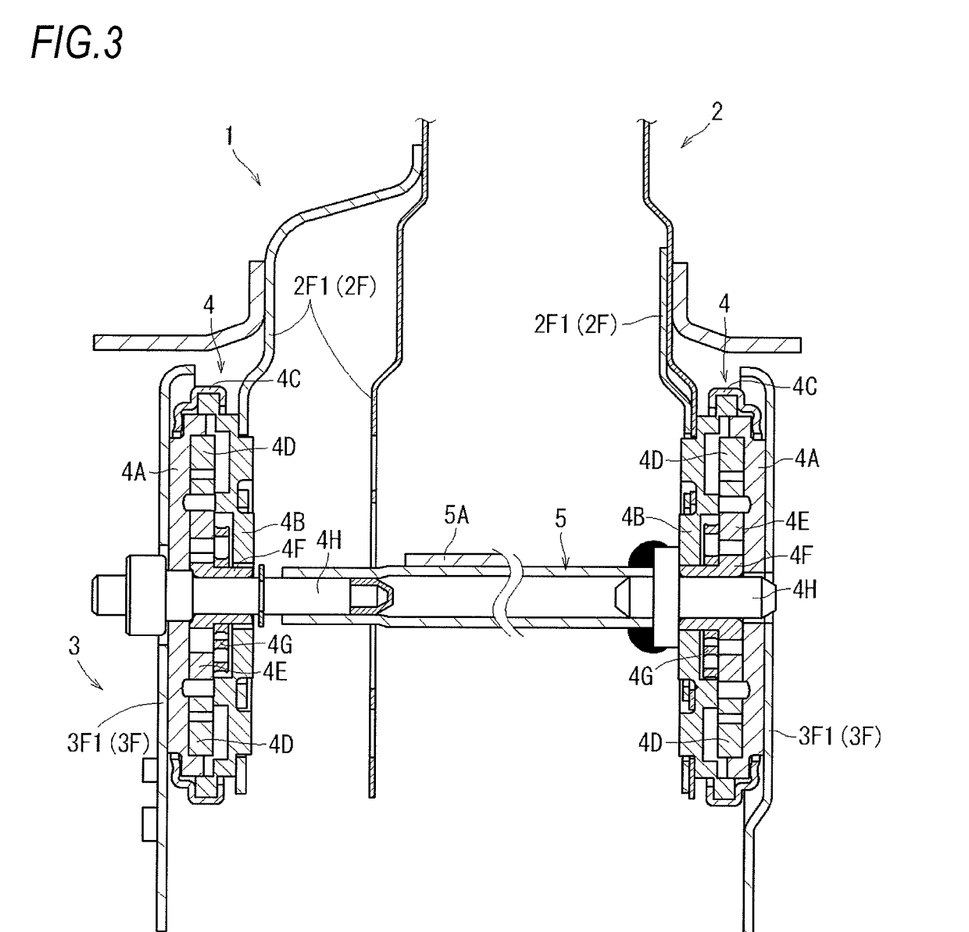
FIG. 3 is a cross-sectional view taken along the line III-III in FIG. 1.

Herein, each basic structure of the above-described reclining devices 4 and 4 will be described. The reclining devices 4 and 4 are respectively placed at left and right sides in a symmetrical manner. Since the basic configuration of both relining devices is identical to each other, the configuration of the one reclining device 4 only will be described on behalf of those. As illustrated in FIG. 3, the reclining device 4 includes a disc-shaped latchet 4A integrally connected to an inner portion of the side frame 3F1 of the seat cushion frame 3F, and a disc-shaped guide 4B integrally connected to an outer portion of the side frame 2F1 of the seat back frame 2F. The latchet 4A and the guide 4B are assembled to coaxially rotate relative to each other in a state the latchet and the guide are prevented from being axially released by a circumferential ring 4C. In addition, the reclining devices 4 and 4 include two pawls 4D and 4D having outer teeth which are assembled between the latchet and the guide, a hinge cam 4F provided and supported on the center portion of the guide 4B, and a slide cam 4E slid by the hinge cam 4F, respectively. When the hinge cam 4F rotates around its axis, two pawls are pressed by the slide cam 4E, and thus are meshed with the latchet 4A or released from the meshing state with the latchet 4A. As a result, the relative rotation of the latchet 4A and the guide 4B can be locked or unlocked.

The hinge cam 4F is usually rotatably urged by the biasing force of a spring 4G hooked between the hinge cam and the guide 4B to hold each of the pawls 4D and 4D and the latchet 4A in a meshing state. This causes the reclining device 4 to lock the backrest angle of the seat back 2 in the state where the relative rotation of the latchet 4A and the guide 4B is locked at all times. However, since the operation shaft 4H penetrated into the center portion of the hinge cam 4F and integrally rotating with the hinge cam is rotated by the above-described forward down operation of the handle lever 6 (see FIG. 1), the hinge cam 4F is rotated against the urging force of the spring 4G to return the respective pawls 4D and 4D from the meshing state with the latchet 4A. This causes the latchet 4A and the guide 4B to release from the rotation locking state, and thus the fixing state of the backrest angle of the seat back 2 is released.

Figure 2:
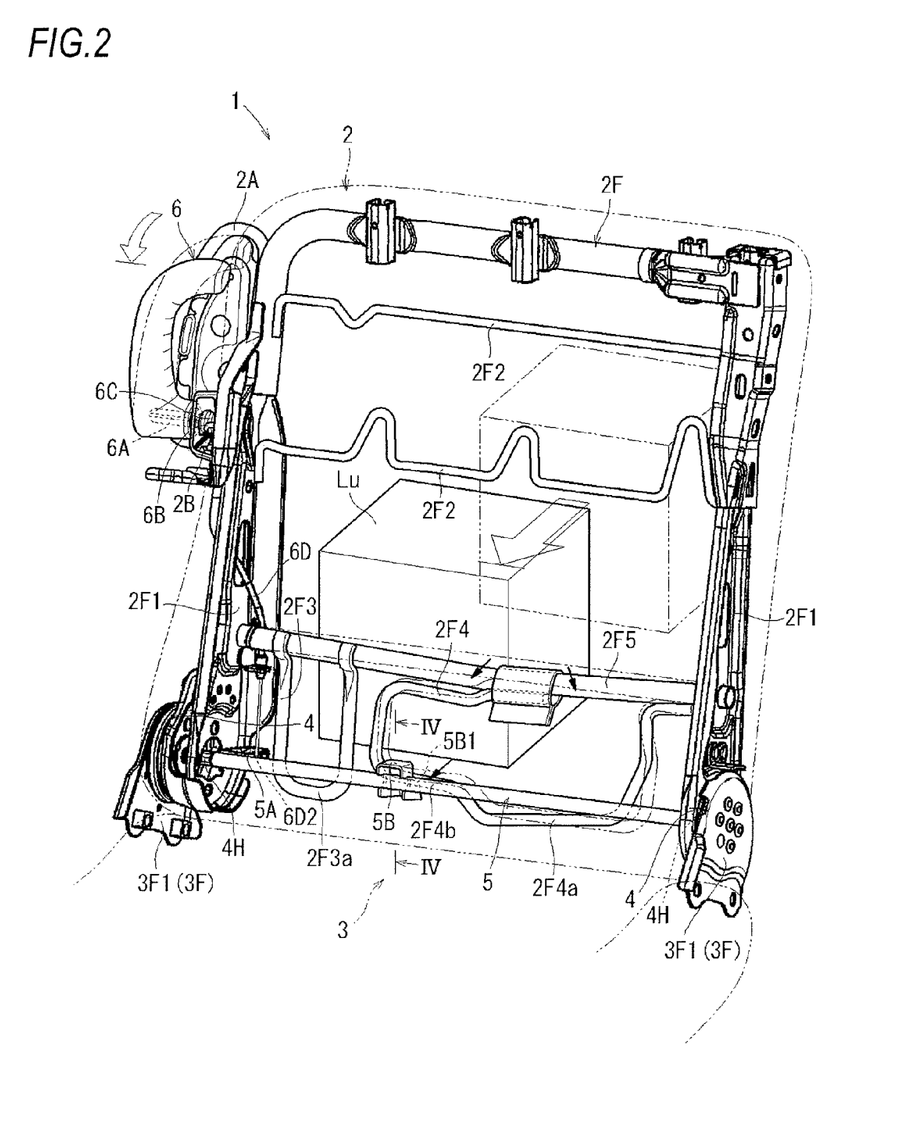
FIG. 2 is a perspective view illustrating a state where an in-vehicle installed object collides against a seat back from a rear side at the time of vehicle collision.

In the meantime, as illustrated in FIG. 2, each of the above-described reclining devices 4 and 4 is configured such that an unexpected case is considered in which, for example, at the time of vehicle frontal collision, the handle lever 6 is unexpectedly reclined forward by the impact, so that its lock is released. In addition, as illustrated in the drawing, each of the above-described reclining devices 4 and 4 is configured to consider even an unexpected case where at the time of vehicle frontal collision, an in-vehicle installed object Lu (for example, a heavy load such as wine case) placed in a luggage space at the rear side of the seat back 2 collides against the seat back 2 from the rear side, and, if the collision occurs near the one side frame 2F1 of the seat back 2, the side frame 2F1 of the same side is rotated forward together with the reclining device 4 and the operation shaft 4H, so that the opposite operation shaft 4H is rotated through the rod 5 to release the lock state of the opposite reclining device 4. In order to prevent the above-described unexpected situation, however, the vehicle seat 1 according to this illustrative embodiment includes a locking structure (a support wire 2F4 which is an example of a deformation member), provided to the seat back frame 2F, for constraining the rotational movement of the rod 5, at the time of vehicle frontal collision, to prevent the respective reclining devices 4 and 4 from being unlocked.

Hereinafter, the structure capable of restraining the rotational movement of the rod 5 will be described in detail.

As illustrated in FIG. 1, the seat back frame 2F includes a plurality of support wires 2F2, 2F2, 2F3, and 2F4 extending between the left and right side frames 2F1 and 2F1. These support wires 2F2, 2F2, 2F3, and 2F4 are configured to support a cushion pad (not illustrated in the drawings), which is set to the front portion of the seat back frame 2F, from the rear side. In addition, the seat back frame 2F includes a reinforcing member 2F5 made of a steel tube (round pipe) at its lower area, which supports a waist portion of the seated passenger, between both side frames 2F1 and 2F1 of the seat back frame. The reinforcing member 2F5 has both end portions integrally welded and joined to the side frames 2F1 and 2F1 in a state where both end portions penetrate into the respective side frames. Therefore, the seat back frame 2F is assembled in a frame to improve its torsional rigidity.

The reinforcing member 2F5 is provided with two support wires 2F3 and 2F4 which are bent in a substantially U-shape. Both end portions of the respective support wires 2F3, 2F4 are fixed and suspended downward therefrom, respectively. The support wires 2F3 and 2F4 have horizontal portions 2F3a and 2F4a extending in a horizontal width direction of the lower end sides thereof and protruding more downward than the above-described rod 5, respectively. The horizontal portions 2F3a and 2F4a are configured to maintain the position of a lower edge portion of a cushion pad (not illustrated in the drawings) placed at the front portion thereof, and prevent a gap from being formed between the seat cushion 3 and the cushion pad due to the upward bending of the lower edge portion of the cushion pad. Specifically, the cushion pad (not illustrated in the drawings) is configured to maintain the state where the cushion pad is pressed against the front portion of the seat back frame 2F, by a tensioning force of a surface skin spread on the surface of the cushion pad. A lower edge portion of the surface skin passes through the lower end side of the seat back 2 and then is pulled in a rear direction, while an upper edge portions passes through the upper end side of the seat back 2 and then is pulled and bent in the rear direction. In this instance, a hook made of resin (not illustrated in the drawings) attached to each edge portion is hooked to each other, so that the surface skin covers the entire surface of the cushion pad. Accordingly, the lower end portion of the cushion pad (not illustrated in the drawings) is strongly pulled and bent toward the upper side by the tensioning force of the surface skin, so that a gap may be formed between the seat cushion 3 and cushion pad. However, the bending is prevented by holding the seat cushion with the horizontal portions 2F3a and 2F4a, and thus no gap is formed between the seat cushion 3 and the cushion pad.

Figure 4:
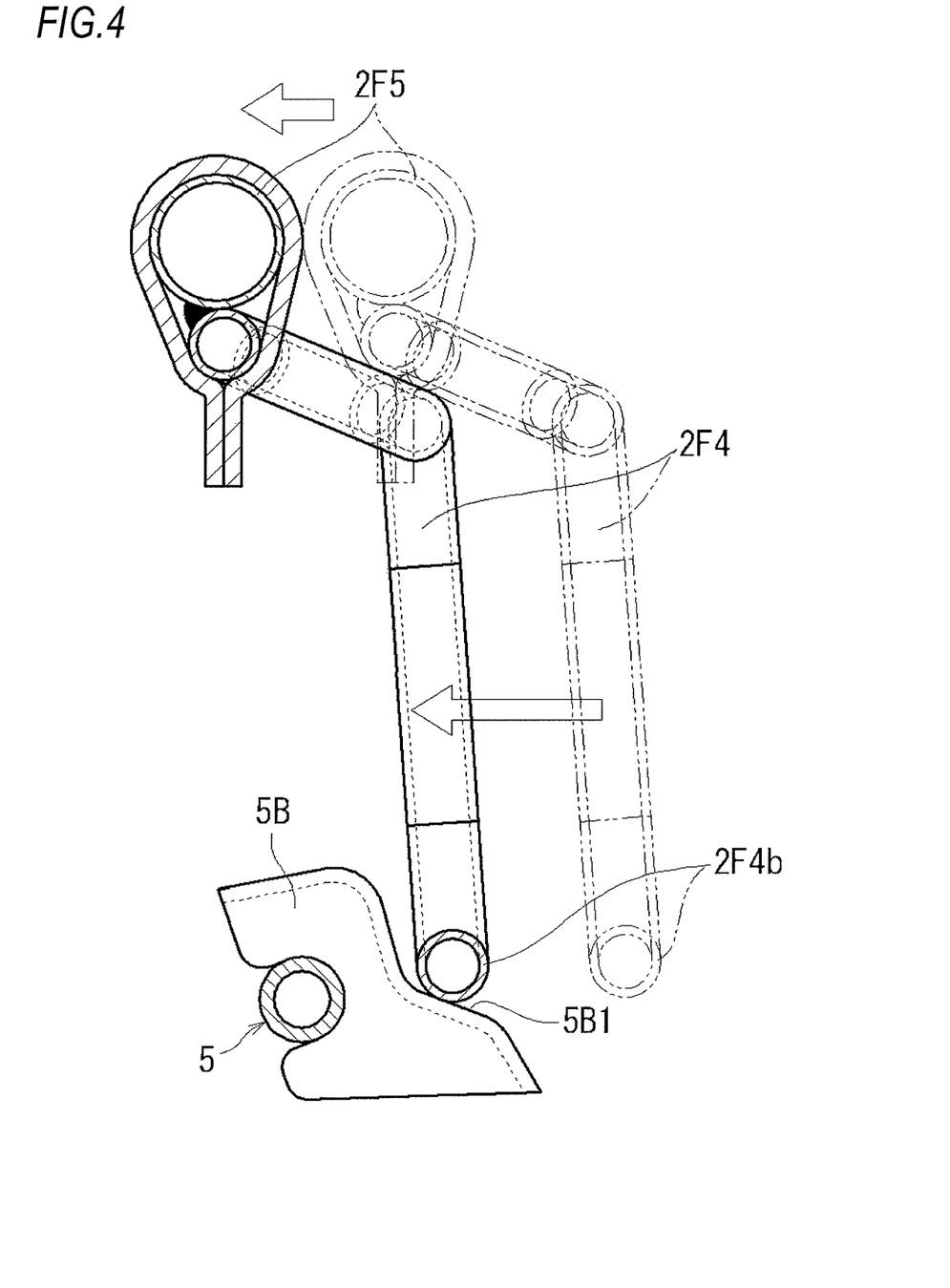
FIG. 4 is a cross-sectional view taken along the line IV-IV in FIG. 2.

One support wire 2F4 of two support wires described above is provided with an engaging portion 2F4b extended in a horizontal width direction from the horizontal portion 2F4a in a stepped shape. A locking portion 5B is integrally engaged to the outer circumferential portion of the rod 5 which is positioned in front of the engaging portion 2F4b, and is extended toward a rear side in which the engaging portion 2F4b is positioned. As illustrated in FIG. 4, at the time of vehicle frontal collision, the engaging portion 2F4b is deformed to move forward by the collision of the in-vehicle installed object Lu (see FIG. 2), as described below. In this case, the locking bracket 5B functions as a receiving component for locking the rotational movement (rotational movement in a direction to release the lock of the respective reclining devices 4 and 4) of the rod 5 in a counterclockwise direction illustrated in the drawings, while the engaging portion 2F4b is received on the upper surface of the locking bracket 5B.

The engaging portion 2F4b of the support wire 2F4 is normally positioned at the rear portion of the rod 5 and the locking bracket 5B, as illustrated in FIG. 4. At the time of vehicle frontal collision, the in-vehicle installed object Lu collides against the above-described reinforcing member 2F5, and the reinforcing member 2F5 is deformed to move forward in a state where its center portion is bent. As illustrated in FIG. 4, the reinforcing member 2F5 climbs the upper surface of the locking bracket 5B to restrain the rotational movement of the rod in the counterclockwise direction illustrated in the drawing. The restraint force to restrain the rotational movement is assured by the support strength of the reinforcing member 2F5, with both end portions of the reinforcing member being supported by both side frames 2F1 and 2F1 of the seat back frame 2F. Even though the handle lever 6 is applied with the force to operate the handle lever 6 in a forward reclining direction due to the impact of the above-described vehicle frontal collision, the restraint force to prevent the rod 5 from rotating is produced.

The rear surface, on which the engaging portion 2F4b climbs from the rear side, of the locking bracket 5B is extended at a slant to allow the engaging portion to climb forward, as illustrated in FIG. 4, thereby guiding the climbing of the engaging portion 2F4b. The engaging portion 2F4b climbs a locking surface 5B1 which is formed on the middle portion of the slope, and the inclined angle of the slope is gentle at the middle portion. According to the support wire 2F4 having the engaging portion 2F4b, as illustrated in FIG. 2, among both end portions connected to the reinforcing member 2F5, one end portion bent upward, extended from the edge, which is formed with the engaging portion 2F4b at the illustrated left side, and connected to the reinforcing member 2F5 is connected to a portion near the center portion of the reinforcing member 2F5 in the horizontal width direction. The support wire 2F4 is configured such that at the time of vehicle frontal collision, the reinforcing member 2F5 collides against the in-vehicle installed object Lu, and thus its center portion is most severely deformed to move forward, so that the engaging portion 2F4b is effectively deformed to move forward.

The support wire 2F4 having the engaging portion 2F4b may not be always deformed by the deformation of the reinforcing member 2F5 at the time of the vehicle frontal collision. That is, the reinforcing member 2F5 is placed at the position of a lower region which is likely to relatively collide against the in-vehicle installed object Lu, at the time of the vehicle frontal collision, even though the installation (object) is not large. It is of course that the in-vehicle installed object Lu may directly collide against the support wire 2F4, and thus the support wire 2F4 may be deformed forward. The support wire 2F4 is connected to the reinforcing member 2F5 at the upper end portion thereof, and the lower end portion is supported in a cantilever manner. The support wire is configured such that the engaging portion 2F4b at its lower end portion is likely to be deformed to move forward in a shape of pendulum around its upper end portion, which connected to the reinforcing member 2F5, as a pivot point, when the support wire collides against the in-vehicle installed object Lu.

With the vehicle seat 1 according to this illustrative embodiment, at the time of the vehicle frontal collision, the support wire 2F4 (engaging portion 2F4b) is deformed to move by the collision of the in-vehicle installed object Lu from the rear side, and then is engaged to the rod 5. As a result, it is possible to prevent the lock of the reclining devices 4 and 4 from being released due to transmission of the unexpected turning force at the application of a heavy load, without deteriorating the strength of the rod 5. In addition, since the support wire 2F4 is supported and installed to the reinforcing member 2F5, which is extended between both side frames 2F1 and 2F1 of the seat back 2 at the rear portion of the rod 5, in the cantilever manner, the support wire 2F4 is easily deformed to move forward by the collision of the in-vehicle installed object Lu from the rear side, at the time of the vehicle frontal collision. Accordingly, it is possible to more suitably achieve the function of preventing the lock of the reclining devices 4 and 4 from being released by the engaging portion 2F4b of the support wire 2F4.

Figure 6A:
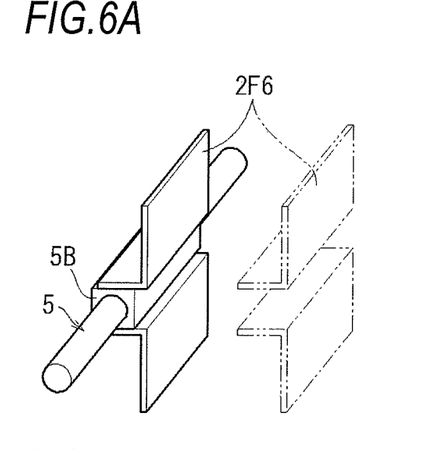
FIG. 6A is a perspective view illustrating a structure according to another illustrative embodiment, in which a deformation member is engaged to a rod.
Figure 6B:
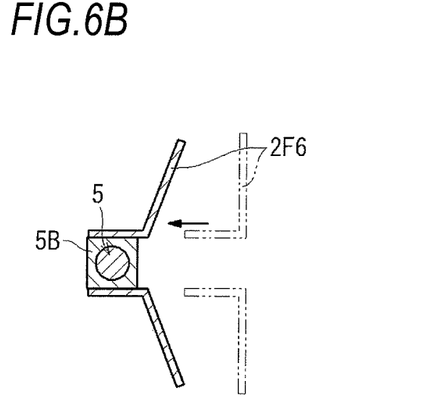
FIG. 6B is a cross-sectional view of the structure.

In the above, an illustrative embodiment of the present invention has been described by use of one example, but the present invention may be carried out in various modes, as well as the above-described illustrative embodiment. For example, the locking structure capable of restraining the rotational movement of the rod 5 at the time of the vehicle frontal collision may be configured as the following. That is, as illustrated in FIGS. 6A and 6B, the rod 5 is connected to the locking bracket 5B having a circumferential portion formed in a shape of rectangular tube, and a deformation member 2F6 is provided to the rear portion of the locking bracket in a state where the deformation member is connected to the seat back frame 2F. The deformation member is inserted and connected to the locking bracket 5B by the forward deformation movement, which is caused by the collision of the in-vehicle installed object (not illustrated in the drawings) at the time of vehicle frontal collision, in a state where the deformation member comes in surface contact with upper and lower surfaces of the locking bracket 5B, thereby restraining the rotational movement of the rod 5.

Figure 7A:
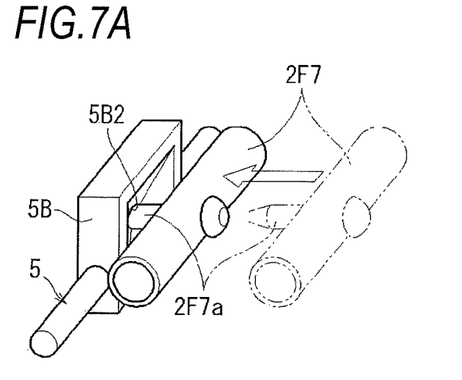
FIG. 7A is a perspective view illustrating a structure according to a still another illustrative embodiment, in which a deformation member is engaged to a rod.
Figure 7B:
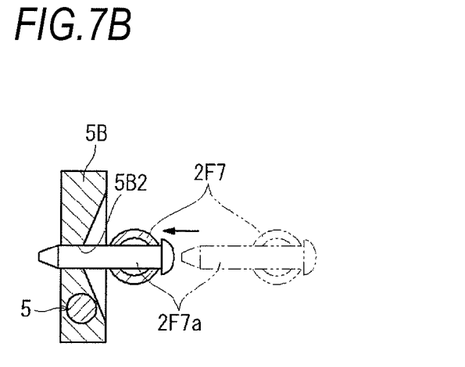
FIG. 7B is a cross-sectional view of the structure.
Figure 8A:
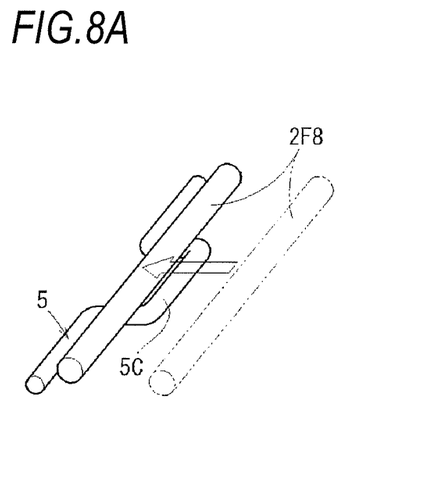
FIG. 8A is a perspective view illustrating a structure according to a further illustrative embodiment, in which a deformation member is engaged to a rod.
Figure 8B:
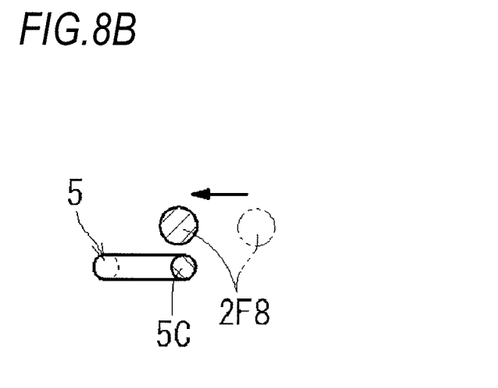
FIG. 8B is a cross-sectional view of the structure.

As illustrated in FIGS. 7A and 7B, the locking bracket 5B connected to the rod 5 may be provided with a locking hole 5B2, and a deformation member 2F7 may be provided at the rear portion of the locking bracket 5B. The deformation member 2F7 may be provided with a locking pin 2F7a which is inserted into the locking hole 5B2 by the forward deformation movement which is caused by the collision of the in-vehicle installed object (not illustrated in the drawings) at the time of vehicle frontal collision. In addition, as shown in FIGS. 8A and 8B, a portion of the rod 5 may be provided with a crank portion 5C bent to protrude in a rearward direction, and a deformation member 2F8 engaged to the seat back frame 2F may be provided on the crank portion 5C. The deformation member 2F8 climbs on the crank portion 5C by the forward deformation movement which is caused by the collision of the in-vehicle installed object (not illustrated in the drawings) at the time of vehicle frontal collision. That is, the locking structure capable of restraining the rotational movement of the rod at the time of vehicle frontal collision may be preferably configured such that the deformation member provided to the seat back collides against the in-vehicle installed object at the time of vehicle frontal collision and thus is engaged to the rod, to restrain the rotational movement of the rod with the support of the framework strength of the seat back. The locking structure may employ various configurations. In addition, the illustrative embodiment discloses that the vehicle seat is configured as the second-row seat of the vehicle having three row seats, but it may be configured as a final-row (third-row) seat. Furthermore, it may be configured as a second-row (final-row) of a vehicle having two row seats.

What is claimed is:

1. A vehicle seat comprising:
   reclining devices which are provided at both left and right side portions of a seat back, respectively, and having operation shafts connected to each other by a rod such that the operations shafts of the respective reclining devices rotate in synchronization with each other to release a locking state thereof;
   a deformation member which is supported by a framework of the seat back and is configured to move forward by a collision of an object from a rear side due to a vehicle collision, the deformation member including an engaging portion positioned at a rear portion of the rod; and
   a locking portion integrally engaged with the rod between the deformation member and the rod and configured to lock rotational movement of rod, the locking portion including a rear side that extends in a downward slanted direction and having a locking surface that includes a steep slope portion and a gentle slope portion configured to engage the engaging portion of the deformation member,
   wherein during the collision of the object from the rear side, the engaging portion of the deformation member is moved forward to climb the locking surface of the locking portion from the gentle slope portion toward the steep slope portion such that the deformation member is engaged to the rod via the locking portion to restrain a rotational movement of the rod in an unlocking direction of the reclining devices.

2. The vehicle seat according to claim 1, wherein the deformation member is supported by a reinforcing member in a cantilever manner, the reinforcing member extending between frameworks of both side portions of the seat back at a rear side of the rod.

3. The vehicle seat according to claim 1, further comprising:
   a handle lever which is configured to rotate the operation shafts of the respective reclining devices in the unlocking direction,
   wherein the handling lever is configured to be rotated by a forward down operation at a shoulder portion of the seat back.

4. The vehicle seat according to claim 1, further comprising:
   a cushion pad which is provided at a front portion of the framework of the seatback,
   wherein the deformation member is configured to maintain a position of the cushion pad.

* * * * *